Figure 1:
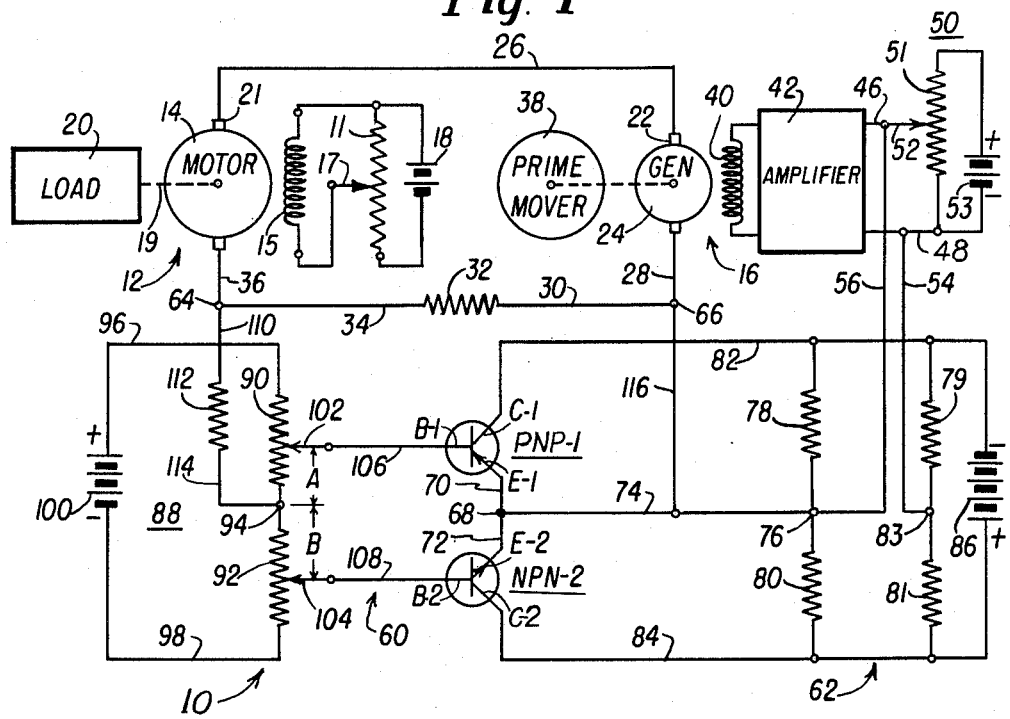

Oct. 22, 1963 A. W. WILKERSON 3,108,214
WARD-LEONARD MOTOR CURRENT OVERLOAD CONTROL SYSTEM
Filed Jan. 11, 1960

INVENTOR.
Alan W. Wilkerson
BY
Byron Hume Groen & Clement
Attys.

United States Patent Office 3,108,214
Patented Oct. 22, 1963

3,108,214
WARD-LEONARD MOTOR CURRENT OVERLOAD CONTROL SYSTEM
Alan W. Wilkerson, Racine, Wis., assignor to The Louis Allis Co., Milwaukee, Wis., a corporation of Wisconsin
Filed Jan. 11, 1960, Ser. No. 1,733
3 Claims. (Cl. 318—144)

The present invention relates to control systems and, more particularly, to a control system for controlling an electrical driving apparatus.

It is an object of the present invention to provide a new and improved control system for an electrical driving apparatus, for example an electric motor.

It is another object of the present invention to provide for an electrical driving apparatus a control system that assures safe and dependable operation of the driving apparatus.

It is yet another object of the present invention to provide a new and improved control system for controlling the magnitude of armature current of an electric motor.

It is a further object of the present invention to provide a control system which limits the maximum armature current in an electric motor during periods of acceleration, deceleration, or overload.

It is yet another object of the present invention to provide for an electric motor a control system that operates to reduce excessive armature current in the motor, yet does not at any other time interfere with the normal operation of the motor.

It is a further object of the present invention to provide a new and improved control system which maintains an armature current of an electric motor below a predetermined level, irrespective of acceleration, deceleration, or overload of the machine.

It is an object of the present invention in accordance with the previous object to provide a control system that is responsive to bidirectional armature currents.

The above and other objects are achieved in accordance with the present invention by providing a new and improved control system for controlling an electrical driving apparatus. The speed of the electrical apparatus is regulated by a speed-regulating device which is over-ridden by the control system in response to acceleration, deceleration, or overload of the electrical apparatus. As is well known, the magnitude of the armature current in the driving apparatus changes appreciably during periods of acceleration, deceleration and overload. In addition, when the speed of the driving apparatus increases or decreases because of a load change, it is always accompanied by an inherent tendency on the part of the armature current to decrease or increase, respectively. Whenever the armature current of the electrical apparatus exceeds a predetermined value, the control system operates to produce an output signal that is supplied to the speed-regulating device. The output signal overrides the speed-regulating device and causes the amount of armature current flowing in the armature of the driving apparatus to be reduced, thereby preventing the armature of the apparatus from overheating, with resultant damage to the driving apparatus. The control system performs its intended function irrespective of whether or not the armature current is positive or negative and, in this respect, operates as a bidirectional current limiting system.

Figure 2:
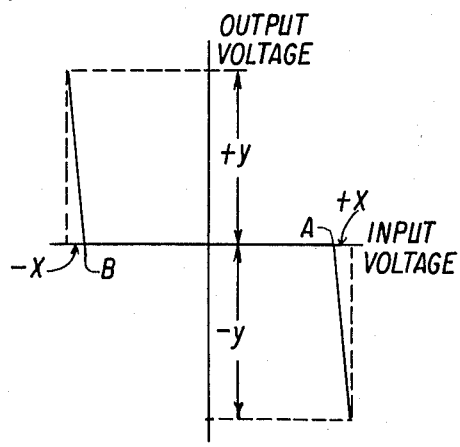

The invention, both as to its organization and method of operation, taken with further objects and advantages thereof, will best be understood by reference to the following description taken in connection with the accompanying drawings, in which:

FIGURE 1 is a schematic view of an electrical driving apparatus and associated control system embodying the features of the present invention; and FIGURE 2 is a view of a graph illustrating the input versus output characteristics of the control system.

Referring now to the drawing and particularly to FIG. 1, a control system embodying the principles of the present invention is illustrated and is identified generally by reference numeral 10. The control system 10 is shown as used in connection with an electrical driving apparatus 12 comprising specifically a D.C. motor 14, the D.C. motor 14 being normally controlled by a speed-regulating device of the Ward-Leonard type 16. Although the control system of the present invention is described with the above installation, it should be understood that the control system of the present invention is not limited to this application since it has utility in many other fields. Irrespective of the specific type of D.C. motor 14 with which the control system 10 is used, the system 10 operates during periods of acceleration, deceleration, and overload to protect the armature winding of the motor 14 from excessive armature currents; to this end, the armature current in the armature circuit of the motor 14 is maintained at all times below a predetermined value.

The D.C. motor 14 may comprise a conventional shunt, series or compound motor but for the purpose of this description the motor 14 is illustrated as a separately excited, shunt motor having a field winding 15 connected at one end to the upper end of a potentiometer winding 11 and at the other end to a variable wiper 17, the ends of the winding 11 being connected in parallel with a battery 18. By this arrangement, the value of the flux generated by the field winding 15 and, hence, the speed of the motor 14 is controlled by the variable wiper 17. In any event, the motor 14 drives through a suitable mechanical coupling 19 a load 20 which may or may not change. Armature starting resistances are not illustrated in order to simplify the drawing but, as is customary, suitable starting resistances or other electrical elements are provided for in the D.C. motor 14.

Considering now the speed-regulating device 16, during normal operation it exclusively controls the speed and operation of the motor 14 but during periods of acceleration, deceleration, or overload the regulating device 16 acts in conjunction with the control system 10 to control the operation of the motor 14; actually, during periods of acceleration, the regulating device 16 is overridden by the control system 10. Briefly, the regulating device 16 includes a separately excited generator 24 having an armature winding 22 serially connected to the armature winding 21 of the D.C. motor 14 similar to a Ward-Leonard arrangement. Specifically, the armature windings 21 and 22 are serially connected together, as follows: the armature winding 21, conductor 26, armature winding 22, conductor 28, conductor 30, resistor 32, conductor 34, and conductor 36 connected to the armature winding 20.

It will be appreciated that, since the generator 24 is driven at a constant speed by a prime mover 38, the armature 22 is rotated in the field developed by a separately excited field winding 40. Accordingly, a voltage is developed at the terminals of the generator 24 and, because of the Ward-Leonard arrangement, the generator 24 impresses a voltage across the armature 21 of the motor 14. Inasmuch as the speed of the motor 14 is directly proportional to its impressed armature voltage (and is inversely proportional to its field flux), the speed of the motor 14 can be regulated by adjusting the voltage generated at the armature terminals of the generator 24. Furthermore, it is also known that the magnitude of armature current in the armature 21 of the motor 14 is directly proportional to the difference of the impressed armature voltage, $V_A$, and the counter E.M.F., $E_c$, thus, if the load 20 of the motor 14 increases with a resultant decrease in speed, the counter E.M.F. decreases with the result that the armature current increases. However, the voltage impressed on the motor armature 21 can be decreased to offset the decreased counter E.M.F. by decreasing the voltage generated at the terminals of the generator armature 22 which, in turn, can be decreased by decreasing the field current in or flux developed by the generator field winding 40. Irrespective of the magnitude of the voltage impressed on the armature of the motor 14, a resultant current flows in the above armature circuit since the armatures 21 and 22 are serially connected. Specifically, a current flows through the resistor 32 to produce a voltage drop across the resistor 32 for a purpose described in greater detail below.

Referring now to that portion of the regulating device 16 which controls the magnitude of field current supplied to the field winding 40 of the generator 24, the field winding 40 is energized under the control of the amplifier 42 that is fed by a pair of input conductors 46 and 48 electrically connected across a variable potentiometer 50. Specifically, the conductor 48 is connected to a variable wiper 52, the potentiometer winding 51 being connected in parallel with a battery 53. In its normal speed-regulating operation, the speed-regulating device 16 regulates the speed of the electric motor 14 by regulating the voltage impressed on its armature 21. Specifically, the speed of the motor 14 is increased by moving the variable wiper 52 upwardly along the potentiometer winding 51, whereby a greater input voltage is supplied to the amplifier 42 which in turn increases the field current to the field winding 40. Consequently, greater flux is produced, a greater voltage is developed at the terminals of the armature 22 and a greater voltage is impressed at the motor armature 21, with the result that the speed of the motor 14 increases. Conversely, the speed of the motor 14 is decreased by moving the variable wiper downwardly along the potentiometer winding 51, thereby to reduce the input voltage to the amplifier 42, reduce the field current, reduce the voltage generated at the terminal of the armature 22, reduce the voltage impressed on the motor armature 21, and reduce the speed of the motor 14.

Attention is now directed to the control system 10 embodying the present invention. It acts only when the current in the above-described armature circuit exceeds a predetermined value in order to prevent the overheating of the armature winding 21 of the D.C. motor 14 by overriding the operation of the speed-regulating device 16. Whereas the regulating device 16 exclusively regulates the motor 14 when the current in the armature circuit is below a predetermined value, the control system functions in such a manner as to control the regulating device 16 in either of the two following conditions: (1) when the regulating device over-regulates the motor 14 by suddenly increasing or decreasing the impressed armature voltage, $V_A$ (while the counter E.M.F., $E_c$, initially remains constant) thereby producing a large positive or negative armature current, $I_A$, through the armature resistance $$R_A \left( I_A = \frac{V_A - E_c}{R_A} \right)$$

or (2) when the load suddenly increases and the speed simultaneously decreases, thereby rapidly decreasing the counter E.M.F., $E_c$, and increasing the armature current, $I_A$, $$\left( I_A = \frac{V_A - E_c}{R_A} \right)$$

Briefly, the control system 10 comprises a current responsive section 60 that is responsive to the current in the above-described armature circuit and hence responsible to the armature current in the D.C. motor 14. The section 60 operates only when the current in the armature circuit exceeds a predetermined positive or negative value to unbalance a bridge section 62 for producing an output signal which is supplied to the speed-regulating device 16 by conductors 54 and 56 electrically connected to the input of the amplifier 42.

With the electrical apparatus 12 in an off condition, no current flows through the above-described armature circuit, with the result that the voltage at all points in the armature circuit is zero. Specifically, the voltage at the junction of the armature winding 21 and the resistor 32 (hereinafter called junction 64) is zero and the voltage at the junction of the armature winding 22 and the resistor 32 (hereinafter called junction 66) is also zero; hence, the voltage drop across the resistor 32 is zero and, as described below, the input voltage to the control system 10 is zero. In this condition, a pair of transistors PNP-1 and NPN-2 in the current-responsive section 60 are biased to cut off and, accordingly, are rendered inoperative or nonconductive. When the transistors PNP-1 and NPN-2 are nonconductive, the current-responsive section 60 does not effect an unbalance in the bridge section 62 and consequently the control system 10 produces no output signal at the output leads 54 and 56. Thus, when the apparatus 12 is inoperative, the control system 10 does not in any way affect the operation of the Ward-Leonard type speed-regulating device 16.

Considering now the current-responsive section 60 in greater detail, the base B-1 of the transistor PNP-1 is biased positive with respect to the emitter E-1 of the transistor PNP-1, while the base B-2 of the transistor NPN-2 is biased negative with respect to the emitter E-2 of the transistor NPN-2. With the junction 64 (left end of resistor 32) electrically connected to the base B-1 and base B-2, as described below, and the junction 66 (right end of resistor 32) electrically connected to the emitter E-1 and emitter E-2, the transistor PNP-1 remains nonconductive as long as a positive D.C. current in the armature current (i.e., current flow across the resistor 32 from right to left) remains below a predetermined value and, hence, the potential drop across the resistor 32 (which produces the input voltage to the system 10) remains at a low value so as not to drive the base B-1 negative with respect to the emitter E-1. As long as this condition obtains, the transistor PNP-1 is not rendered conductive and the bridge section 62 is not unbalanced to produce a negative output signal for the regulating device 16. Similarly, the transistor NPN-2 remains nonconductive as long as a negative D.C. current in the armature circuit (i.e., current flow across the resistor 32 from left to right) remains below a predetermined value and, hence, the potential drop across the resistor 32 (which produces the input voltage to the system 10) remains at a low value so as not to drive the base B-2 positive with respect to the emitter. As long as this condition obtains, the transistor NPN-2 is not rendered conductive and the bridge section 62 is not unbalanced to produce a positive output signal for the regulating device 16.

As clearly shown in FIG. 1, the base and emitter voltages of transistors PNP-1 and NPN-2 are supplied by voltage divider arrangements. Specifically, the emitter E-1 of transistor PNP-1 and emitter E-2 of transistor NPN-2 are electrically connected together as a junction 68 by conductors 70 and 72, the junction 68 being connected via conductor 74 to a junction 76 in the bridge section 62. The bridge section is further connected via conductors 82 and 84 across a battery 86 having a rated value of 10 volts, for example. Since the values of the resistors 78 and 80 are the same, the emitters E-1 and E-2 are at a voltage equal to half of rated value of the battery 86, i.e., 5 volts.

It will be noted that the junctions 68 and 70 are electrically connected to the output conductor 56 and that a pair of resistors 79 and 81 comprising the two other arms of the bridge section 62 are also electrically connected via conductors 82 and 84 across the battery 86. Furthermore, the resistors 79 and 81 are electrically connected together at junction 83 which is connected to output conductor 54. As is conventional, the collector C–1 of the transistor PNP–1 is at a more negative voltage than the emitter E–1 while the collector C–2 of the transistor NPN–2 is at a more positive voltage than the emitter E–2. To this end, the collectors C–1 and C–2 are respectively connected via conductors 82 and 84 to the negative and positive terminals of the battery 86, whereby the collector C–1 is at zero voltage and the collector C–2 is at 10 volts as compared to the 5 volts of the emitters E–1 and E–2.

On the other hand, the base B–1 of transistor PNP–1, and the base B–2 of transistor NPN–2 are connected to different points in a voltage divider arrangement, identified generally as 88, since the voltage of base B–1 must be more positive than the voltage of the emitters E–1 and E–2 and the base B–2 must be more negative than the voltage of the emitters E–1 and E–2. The divider arrangement includes a pair of serial resistors 90 and 92 connected together at junction 94 and further connected via conductors 96 and 98 across a battery 100 having a rated value of 10 volts, for example. The resistors 90 and 92 have the same values such that the voltage at junction 94 is equal to one-half the rated value of the battery 100, i.e., 5 volts; furthermore, voltage values of from 10 volts appear across the resistor 90 while voltage values of from 5 volts to zero volts appear across the resistor 92. As illustrated, wipers 102 and 104 respectively coact with the resistors 90 and 92 and are electrically connected via conductors 106 and 108 to the respective bases B–1 and B–2, whereby the voltage of base B–1 can be set between 5 and 10 volts (the emitter E–1 being at 5 volts) to bias the transistor PNP–1 to cut-off and the voltage of base B–2 can be set between zero and 5 volts (the emitter E–2 being at 5 volts) to bias the transistor NPN–2 to cut-off. As a matter of convenience, the voltage drop across that part of the resistor 90 between junction 94 and wiper 102 (base B–1) is identified as the bias or A-voltage, while the voltage drop across that part of the resistor 92 between junction 94 and wiper 104 is identified as the bias or B-voltage. It will be appreciated that, since the junction 68 (emitters E–1 and E–2) and the junction 94 are at the same voltage, the biasing voltages on the transistors PNP–1 and NPN–2 are respectively equal to voltage A and voltage B. As described hereinafter, the A-voltage and B-voltage can be adjusted by moving the wipers 102 and 104 to limit the maximum amount of current flowing in the armature circuit and, hence, the maximum voltage drop across resistor 32. For example, if the armature 21 of the motor 14 is able to withstand only a low maximum armature current, the wipers are moved toward the junction 94 to reduce the value of the A-voltage and B-voltage—and vice versa.

The control system 10 and the armature circuit are interrelated so that the current-responsive section 60 of the system 10 senses the presence of an excessive armature current in the armature 21. In this connection, the section 60 detects the amount of current flowing in the armature circuit by detecting the voltage drop across the resistor 32. More specifically, the junction 64 (left end of the resistor 32) is electrically connected via a conductor 110, resistor 112, and conductor 114 to the junction 94 of the voltage divider resistors 90 and 92, while junction 66 is electrically connected via conductor 116 and conductor 74 to the junction 68 of the emitters E–1 and E–2. Hence, in response to the flow of a positive D.C. current in the armature circuit (i.e., from right to left across the resistor 32), there is developed across the resistor 32 a voltage drop which produces an input voltage for the current responsive section 60 across conductors 110 and 116. This input voltage causes the junction 94 to become more negative with respect to the junction 68, thereby producing a voltage in opposition to the biasing A-voltage in the transistor PNP–1. Conversely, in response to the flow of a negative D.C. current in the armature circuit (i.e., from left to right across the resistor 32), there is developed across the resistor 32 a voltage drop which produces an input voltage of opposite polarity to the above input voltage for the section 60 across conductors 110 and 116. This input voltage causes the junction 94 to become more positive with respect to the junction 68, thereby producing a voltage in opposition to the biasing B-voltage on the transistor NPN–2. Neither of the above opposition voltages causes the current-responsive section 60 to unbalance the bridge section 62 unless the value of the opposition voltages exceeds the value of the A- or B-voltages, as indicated above.

Considering now the operation of the control system 10 in greater detail, it is inoperative, i.e., the bridge section 62 remains balanced and produces no output current for the regulating device 16, whenever either of the following two conditions exist:

(1) the driving apparatus 12 is in an off-condition, or
(2) the driving apparatus is in an on-condition and the current in the armature circuit remains below a predetermined value.

If it be assumed that the driving apparatus 12 is off, then no current flows through the armature circuit and the voltage drop across the resistor 32 is zero. Hence no input voltage is applied to the input conductors 110 and 116. Accordingly, the voltage of the junctions 68 and 94 are equal and the transistor PNP–1 is biased to cut-off by the biasing A-voltage while the transistor NPN–2 is biased to cut-off by the biasing B-voltage. Since the transistors PNP–1 and NPN–2 are non-conductive, the bridge section 62 remains balanced and the system 10 produces no output. Inasmuch as the resistors 78, 79, 80 and 81, comprising the four arms of the bridge section 62, are of equal value and are shunted across the battery 86, the junctions 76 and 83 are at the same voltage so that no output current flows in the output conductors 54 and 56. Although the transistors PNP–1 and NPN–2 are shunted across the resistors 78 and 80, the non-conductive transistors do not affect the balance of the bridge section 62 since the collector to emitter resistance is substantially larger than the resistance of the resistors 78 and 80, respectively. In any event, with no current flowing in the armature circuit, no output voltage is supplied to the speed-regulating device 16 and, thus, the speed-regulating device 16 exclusively controls the motor 14.

If it be assumed that the driving apparatus 12 is turned on and that the current in the armature circuit remains below a predetermined value, a voltage drop appears across the resistor 32 and an input voltage is applied to the input conductors 110 and 116. Consequently, the junction 94 becomes negative with respect to the junction 68 and, assuming that the current remains beneath the predetermined value, the input voltage to the system 10 will be less than the biasing A-voltage. Thus, even though the base B–1 becomes more negative with respect to the emitter E–1, the transistor PNP–1 remains nonconductive since the input voltage to the system 10 (effectively appearing across the base B–2 and emitter E–2) is not high enough to overcome the biasing A-voltage. Similarly, the base B–2 becomes more negative with respect to the emitter E–2, but the transistor NPN–2 is more biased instead of less biased and therefore remains non-conductive. Consequently, with both of the transistors PNP–1 and NPN–2 nonconductive, the bridge section 62 remains balanced and the system 10 supplies no output voltage to the speed regulating device 16 via the output conductors 54 and 56.

As indicated above, the control system 10 is rendered operative only when the current in the armature circuit becomes excessive. Such a condition exists in any one of the three following situations: (1) During acceleration of the motor 14; for example, if the speed regulating device 16 is over-controlled and the wiper 52 is moved too rapidly upwardly along the potentiometer winding 51, a large impressed armature voltage, $V_A$, is applied to the motor 14. Inasmuch as the counter E.M.F., $E_c$, is relatively low because of the relatively low speed of the motor, a high positive armature current flows in the armature circuit $$\left(I_A = \frac{V_A - E_C}{R_A}\right)$$

(2) During deceleration of the motor 14; for example, if the speed regulating device is over-controlled and the wiper 52 is moved too rapidly downwardly along the potentiometer winding 51, the impressed voltage, $V_A$, falls to a low value. Inasmuch as the counter E.M.F., $E_C$, remains at a substantially constant value because the speed remains substantially constant, a high negative armature current flows in the armature circuit $$\left(I_A = \frac{V_A - E_C}{R_A}\right)$$

(3) During an overload condition or when a sudden load is applied to the motor 14; for example, the speed of the motor rapidly decreases in response to an overload condition of the motor 14, thereby rapidly reducing the counter E.M.F., $E_C$, while the impressed armature voltage, $V_A$, remains at a substantially constant value. Consequently, a high positive current flows through the armature circuit $$\left(I_A = \frac{V_A - E_C}{R_A}\right)$$

Let it be assumed that the driving apparatus is rapidly accelerating so that the impressed armature voltage, $V_A$, is substantially greater than the counter E.M.F., whereby an excessive current flows in the armature circuit. As a result, a large voltage drop is produced across the resistor 32 and a large input voltage is applied to the system 10 via input conductors 110 and 116. The input voltages causes the base B–2 to be driven more negative with respect to emitter E–2 and further biases the transistor NPN–2 in a non-conductive condition. However, the input voltage causes the base B–1 to be driven less positive with respect to the emitter E–1 and, since the input voltage is greater than the biasing A voltage, the base B–1 becomes negative with respect to the emitter E–1. Accordingly, current flows in the base-emitter circuit, thus causing the transistor PNP–1 to become conductive, i.e., causing a large current to flow in the emitter-collector circuit, as follows: collector C–1, conductor 82, resistor 78, conductor 74, conductor 70 and emitter E–1. Insofar as the bridge section 62 is concerned, the conducting transistor PNP–1 effectively short-circuits the resistor 78, thereby effectively connecting the junction 76 to the grounded terminal of the battery 86 and decreasing the voltage of junction 76 from five volts to zero volts. Consequently a negative output current appears in the output conductors 54 and 56. The negative output current opposes the positive current from the potentiometer 50 so that the amplifier 42 is supplied with a net current less than the normal potentiometer current. As a result, the current in the field winding 40 is reduced and the voltage generated by the generator 24 is likewise reduced. Hence, the impressed voltage, $V_A$, is also reduced and the high positive armature current is reduced to maintain the current in the armature circuit below the predetermined value.

Referring now to FIG. 2 in greater detail, the input voltage of the control system 10, i.e., the voltage applied to the input conductors 110 and 116, is plotted against the output current of the control system, i.e., the current in the conductors 54 and 56. It will be appreciated that as long as the voltage drop across the armature 32 and hence the input voltage is less than the A voltage, no output current is produced by the control system 10. However, as soon as the input voltage exceeds the A voltage, a negative output current is produced in the output conductors 54 and 56. As illustrated, the input voltage must exceed the A voltage by only an incremental amount in order to completely saturate the transistor PNP–1 so that a relatively high output current is produced by the system 10. For example, if the input voltage is exactly equal to the A voltage, no output current is produced, whereas if the input voltage is equal to the A voltage plus an $x$ voltage, an output current equal to minus $y$ is produced. It will be appreciated that, since the output current of the control system 10 is able to reduce the input current to the amplifier 42, the impresesd armature voltage, $V_A$, is controlled to maintain the current below the predetermined value. Furthermore, it should be understood that the corrective action of the control system 10 is substantially instantaneous and no time delays or time lags are inherent in the system, with the result that the current in the armature circuit never exceeds the predetermined value.

Let it be assumed that the driving apparatus 12 is rapidly decelerated, then the impressed armature voltage, $V_A$, is rapidly reduced—but because the speed remains substantially constant and the counter E.M.F. also remains substantially constant, a high negative current flows in the armature circuit, i.e., current flow from left to right across the resistor 32. Hence, in contrast to the accelerating condition, a negative input voltage is applied to the conductors 110 and 116, with the result that the junction 94 becomes more positive with respect to the junction 68. The input voltage causes the base B–1 to be driven more positive with respect to emitter E–1 and further biases the transistor PNP–1 in a non-conductive condition. However, the input voltage causes the base B–2 to become less negative with respect to the emitter E–2 of the transistor NPN–2 and, since the input voltage is greater than the B voltage, the base B–2 becomes positive with respect to the emitter E–2. Consequently, current flows in the base-emitter circuit, thereby causing the transistor NPN–2 to become conductive, i.e., causing a large current flow in the collector-emitter circuit, as follows: emitter E–2, conductor 72, conductor 74, resistor 80, conductor 84, and collector C–2. Similiar to the conductive transistor PNP–1, the conductive transistor NPN–2 effectively short-circuits the resistor 80 and unbalances the bridge section 62. However, in contrast to the action of the transistor PNP–1, the transistor NPN–2 causes the voltage of the junction 76 to increase. In fact, with the resistor 80 substantially short-circuited, the voltage of the junction 76 is effectively connected to the positive terminal of the battery 86, i.e., ten volts. Hence, whereas the transistor PNP–1 caused a negative five volts to be supplied to the output conductors 54 and 56, the conducting transistor NPN–2 causes a positive current flow to be produced in the output conductors 54 and 56. The positive current adds to the normal current from the potentiometer 50 and thereby increases the net current supplied to the amplifier 42. Consequently, an increased field current is produced, with an attendant increased voltage generated by the generator 24. Hence, the impressed armature voltage $V_A$, is increased and the high negative armature current is reduced to maintain the current in the armature circuit below the predetermined value.

It will be apparent from an inspection of FIG. 2 that as long as the input voltage to the conductors 110 and 116 is less than the B voltage, the control system develops no output current. However, as soon as the input voltage exceeds the B voltage, the control system develops a positive output current. As in the previously described condition, the negative input voltage must exceed the B voltage by only an incremental amount in order to completely saturate the transistor NPN–2 so that the system 10 produces a relatively high output current. For example, if the input voltage is exactly equal to the B voltage, no output current is produced, whereas if the input voltage is equal to the B voltage plus a minus $x$ voltage, the control system produces a current equal to plus $y$.

Let it be assumed that the driving apparatus 12 is operating at rated speed and that suddenly a large load is applied. The increased load causes the speed to abruptly decrease with the result that the counter E.M.F., $E_C$, suddenly decreases. Accordingly, since the impressed armature voltage $V_A$ remains substantially constant, a high positive current flows in the armature circuit and a positive input voltage is supplied to the input conductors 110 and 116 of the control system 10. The operation of the control system is identical to the operation of the control system during acceleration of the motor 14 and to avoid unnecessary duplication, a description of the control system is not repeated.

While the operation of the bridge section 62 in conjunction with the regulating device 16 has been explained in terms of current flow, and that specifically the amplifier 42 is a current responsive amplifier, it is understood that the bridge section 62 and the regulating device 16 can be arranged as a voltage responsive device. In this last suggested arrangement the output on the conductors 54 and 56 is a voltage signal instead of a current signal and these conductors are connected in the regulating device 16 in a manner so as to apply the voltage signal in series with that provided by the potentiometer 51. In this arrangement the amplifier 42 would be a voltage responsive amplifier providing an output signal in accordance therewith for controlling energization of the field winding 40.

While the embodiment described herein is at present considered to be preferred, it is understood that various modifications and improvements may be made therein, and it is intended that the appended claims cover all such modifications and improvements as fall within the true spirit and scope of the invention.

What is desired to be claimed and secured by Letters Patent of United States is:

1. A control system for controlling an electrical machine having an armature circuit, said system comprising, a controller for regulating the armature current in said circuit, means providing control signals to said controller including a reference voltage source and a normally balanced resistance bridge connected in parallel therewith, a first selectively operative current flow device connected across a first leg of said resistance bridge, a second selectively operative current flow device connected across a second leg of said resistance bridge, and armature current sensing means for rendering said first current flow operative responsive to said armature current flow in one direction exceeding a predetermined amplitude and for rendering said second current flow device operative responsive to said armature current flow in the reverse direction exceeding a predetermined amplitude, thereby to selectively shunt said first leg and said second leg of said resistance bridge and correspondingly unbalance the same to provide to said controller control signals for regulating said armature current flow in both directions below a predetermined amplitude.

2. A control system for controlling an electrical machine having an armature circuit comprising, a controller for regulating the armature current in said circuit, means providing control signals to said controller including a reference voltage source and a normally balanced resistance bridge connected in parallel therewith, an impedance means located in said armature circuit for developing an input voltage proportional to the polarity and amplitude to the armature current in the armature circuit, a first transistor having a base-emitter circuit including said impedance means and a collector-emitter circuit connected in parallel with a first leg of said resistance bridge, a first voltage source in said base-emitter circuit normally rendering said first transistor non-conductive, said first leg of said resistance bridge being shunted responsive to conduction in said first transistor, a second transistor having a base-emitter circuit including said impedance means and a collector-emitter circuit connected in parallel with a second leg of said resistance bridge, and a second voltage source in the base-emitter circuit of said second transistor for normally rendering the same non-conductive, said first transistor being rendered conductive when said input voltage is of a first polarity and exceeds a predetermined magnitude thereby shunting said first leg of said resistance bridge and causing a first output signal to be applied to said controller, said second transistor being rendered conductive when the input voltage is of a second polarity and exceeds a predetermined magnitude thereby shunting said second leg of said resistance bridge and causing a second output signal to be applied to said controller, whereby said current flow through said armature in either direction is regulated below a predetermined amplitude.

3. A control system set forth in claim 2 wherein said first transistor is of the PNP type and said second transistor is of the NPN type.

References Cited in the file of this patent

UNITED STATES PATENTS

| | | |
|---|---|---|
| 2,550,122 | Oshon | Apr. 24, 1951 |
| 2,659,040 | Halter | Nov. 10, 1953 |
| 2,749,493 | Fischer | June 5, 1956 |
| 3,021,466 | Greening et al. | Feb. 13, 1962 |

FOREIGN PATENTS

| | | |
|---|---|---|
| 605,457 | Germany | Nov. 10, 1934 |